May 18, 1965  W. H. DANIELS  3,183,884
TRANSMISSION CONTROL INDICATOR FOR ADJUSTABLE STEERING WHEEL
Filed Oct. 11, 1963
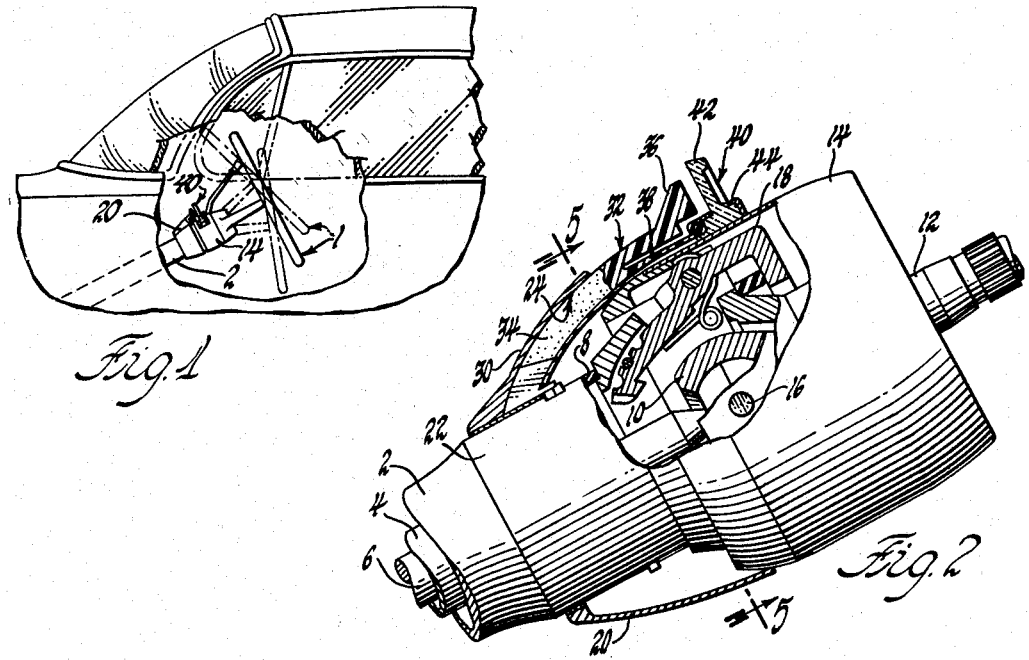
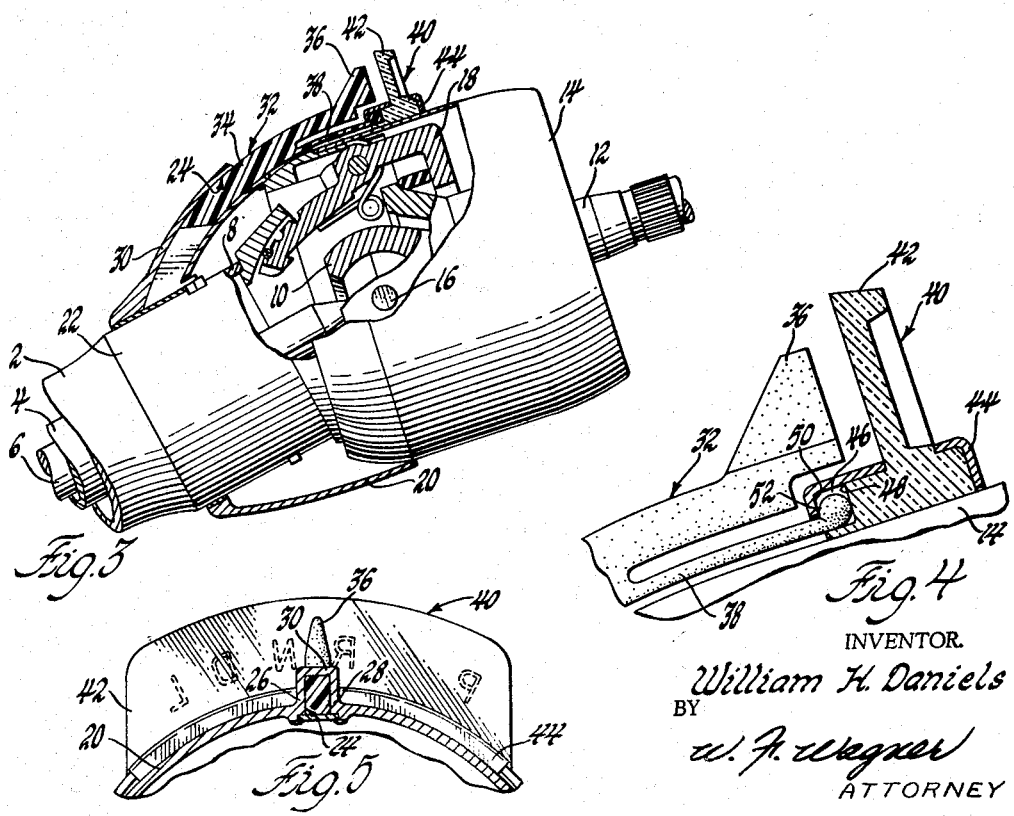
INVENTOR.
William H. Daniels
BY
W. F. Wagner
ATTORNEY

United States Patent Office 3,183,884
Patented May 18, 1965

3,183,884
TRANSMISSION CONTROL INDICATOR FOR
ADJUSTABLE STEERING WHEEL
William H. Daniels, Southfield, Mich., assignor to General
Motors Corporation, Detroit, Mich., a corporation of
Delaware
Filed Oct. 11, 1963, Ser. No. 315,565
8 Claims. (Cl. 116—124)

This invention relates to tilt steering wheel constructions and more particularly to transmission control indicator structures adapted for utilization therewith.

For many years, a large percentage of production passenger vehicles have utilized steering wheel mounted transmission control mechanisms of the type wherein the control handle operates a shift tube which is disposed concentrically relative to the steering column. In devices of this type, it has been common practice to locate the transmission control position indicator on a portion of the shift tube in axial juxtaposed position to an indicator dial which is in turn mounted in a fixed position on a non-rotatable part of the steering column. In operation, the indicator or pointer sweeps through an arc to accomplish the several operating positions and the indicator dial is provided with legends corresponding to such positions.

Very recently, steering column assemblies providing up and down tilting of the steering wheel through a limited range of adjustment have been introduced in passenger vehicles. In such constructions, the non-rotatable portion of the steering column on which the indicator dial is most advantageously located forms a part of the mechanism which is subject to tilting adjustment, while the portion of such constructions in which the indicator pointer is located is not subjected to tilting, but operates through an arcuate path normal to the axis of the non-tilting portion. The present invention is concerned with providing means for maintaining the axial juxtaposed relationship between the pointer and dial irrespective of the variation in inclination between the two portions of the steering column, or the angular position of the pointer.

An object of the present invention is to provide an improved steering column assembly.

Another object is to provide an improved tilt steering wheel assembly.

A further object is to provide an improved transmission control position indicator for use with a tilt steering wheel assembly.

A still further object is to provide a device of the stated character especially adapted for concentric shift tube type steering column assemblies.

These and other objects, advantages and features of the invention will become more fully apparent as reference is had to the accompanying specification and drawing wherein:

FIGURE 1 is a fragmentary side elevational view of a portion of a passenger vehicle with parts broken away to show the general location and range of movement of the steering column assembly in accordance with the invention;

FIGURE 2 is an enlarged side elevational view, partly in section, illustrating the details of construction of the invention;

FIGURE 3 is an enlarged view similar to FIGURE 2 illustrating the relationship of the parts when the assembly is in one of its non-aligned positions of adjustment;

FIGURE 4 is a greatly enlarged partially sectioned view of a portion of the assembly shown in FIGURES 2 and 3; and FIGURE 5 is a fragmentary view looking in the direction of arrows 5—5 of FIGURE 2.

In FIGURE 1 of the drawings, there is shown a portion of a vehicle equipped with a steering column assembly of the type wherein the steering wheel 1 is capable of tilting adjustment in a vertical plane through a range of fixed positions above and below the normal axially aligned position. In general construction and mode of operation, the structure shown in FIGURES 1, 2 and 3 corresponds to that illustrated and described in copending application Serial No. 221,833, Ziegler et al., assigned to General Motors Corporation. Accordingly, for a complete description of the detailed elements, relationships and mode of operation of the tilting mechanism per se, reference may be had thereto.

Referring now to FIGURE 2, the reference numeral 2 designates the steering column or mast jacket which is mounted in fixed angular position in the vehicle. Extending concentrically within jacket 2 is an intermediate concentric shifter tube 4 and a central concentric steering post 6. The upper end of post 6 terminates slightly above the upper extremity 8 of column 2 and is formed with one-half of an anti-back lash universal connection 10. The other half of connection 10 is affixed to a stub shaft 12 rotatably mounted within a non-rotatable housing 14. Housing 14 in turn is tiltably mounted relative to column 2 on a horizontal transverse trunnion 16 which is colinear with the geometric center of universal connection 10. Manually operated latch means 18 disposed within housing 14 enables release and resetting of the angular position of housing 14 relative to column 2 to obtain a plane of rotation for the steering wheel most suitable for operator comfort.

In accordance with the present invention, the transmission control tube is operatively connected to a shifter bowl 20 which is rotatably mounted on the upper enlarged portion 22 of column 2. It will be understood that the usual laterally extending transmission control lever is affixed thereto.

As seen in FIGURE 2, shifter bowl 20 is formed with a radially outwardly depressed slot portion 24 which is curved in cross-section as viewed in side elevation. As seen in FIGURE 5, slot portion 24 includes straight parallel side walls 26 and 28 and curved end wall 30. Extending into slot portion 24 is a pointer assembly 32 comprising a lower end 34 telescopically movable in slot 24 and an upper end comprising a substantially rigid pointer portion 36 and a follower portion 38 which is slightly flexible in a vertical plane. Disposed in axially juxtaposed relation to pointer portion 36 and fixedly mounted on housing 14 is an arcuate transversely extending indicator dial assembly 40. Assembly 40 includes a transparent dial member 42 and an escutcheon mounting 44 which effects attachment of the dial to housing 14.

As seen best in FIGURE 4, dial member 42 is formed in relation to escutcheon 44 so that in assembled relation an arcuate transversely extending trough 46 is formed between the rear edge 48 of the former and the rear margin 50 of the latter, in which is received the terminal enlarged end 52 of follower portion 38. It will, of course, be apparent that the aforementioned rotary movement of shifter bowl 20 responsive to manual manipulation of the transmission control lever, not shown, will induce corresponding angular movement of pointer assembly 32 throughout the arcuate range spanned by dial 42. Consequently, when the tilt steering wheel assembly is in the normal axially aligned position shown in FIGURE 2, the dial and indicator function in the conventional manner so that the pointer is selectively positioned in alignment with the indicia on the transparent dial which establishes the various operating conditions for the transmission.

According to the invention, axial juxtaposed relation of pointer 32 and dial 42 is maintained constant irrespective of change in fixed angular positions of the steering column, as well as compensating for the non-parallel plane of rotation of the shifter bowl relative to dial 42 resulting from any position of adjustment other than axial alignment.

In operation, the assembly functions as follows. When housing 14 is tilted downwardly to the position shown in FIGURE 3, the terminal end 52 of follower 38 is caused to move with escutcheon 44 and thereby induces angular upward telescoping movement of lower end 34 in slot 24. When the housing 14 has been latched in a selected position of adjustment, angular movement of shifter bowl 20 by manipulation of the control lever naturally occurs in a plane normal to the axis of steering column 6 which is non-parallel with the plane of dial 42. However, for each increment of angular adjustment of bowl 20, the terminal end 52 is required to "track" in the trough 46 and thereby imparts the necessary inward or outward telescoping movement of end 34 in slot 24. In consequence, the pointer 36 is caused to move arcuately with shifter bowl 20 but to track variably relative thereto to maintain constant axial juxtaposed relation with dial 42.

While but one embodiment of the invention has been shown and described, it will be apparent that other changes and modifications may be made therein. It is, therefore, to be understood that it is not intended to limit the invention to the embodiment shown, but only by the scope of the claims which follow.

What is claimed is:

1. In a tilt steering assembly having a fixed lower column section and an upper column section tiltable about a horizontal axis relative to said lower section, a transmission control member concentrically surrounding said lower section and rotatable about the axis thereof, a dial assembly fixed on said upper section and tiltable therewith, and a pointer assembly positively rotatable with said control member and telescopable relative thereto in an arcuate path lying in the plane containing the axis of said control member, and means associated with said pointer assembly for imparting telescoping movement thereto responsive to tilting movement of said indicator dial.

2. The structure set forth in claim 1 wherein said arcuate path is generated from a point lying along said horizontal axis.

3. In a steering assembly having a fixed lower column section and an upper column section tiltable about a horizontal axis relative to said lower section, a transmission control member surrounding said lower section and rotatable about the axis thereof, a dial assembly fixed on said upper section and tiltable therewith, a pointer assembly rotatable with said control member telescopingly mounted relative thereto in a plane containing the axis thereof, and interconnecting means on said pointer assembly and dial assembly for imparting telescoping movement to said pointer assembly movable responsive to tilting movement of said dial assembly.

4. In a steering assembly having a fixed lower column section and an upper column section tiltable about a horizontal axis relative to said lower section, a transmission control member surrounding said lower section and rotatable about the axis thereof, a dial assembly fixed on said upper section and tiltable therewith, a pointer assembly rotatable with said control member and telescopingly mounted relative thereto in a plane containing the axis thereof, and interconnecting means on said pointer assembly and dial assembly for imparting telescoping movement to said pointer assembly movable responsive to tilting movement of said dial assembly, said interconnecting means including means enabling free rotation of said pointer assembly irrespective of the inclination of said upper section.

5. The structure set forth in claim 4 wherein said interconnecting means comprises a follower portion on said pointer assembly and a cooperating trough portion on said dial assembly.

6. In a steering assembly having a fixed lower column section and an upper column section tiltable about a horizontal axis relative to said lower section, a transmission control member concentrically surrounding said lower section and rotatable about the axis thereof, a transverse control position indicator dial assembly fixed on said upper section and tiltable therewith, means forming a curved slot portion in said control member in a plane containing the axis thereof, a pointer assembly rotatable with said control member and telescopingly disposed in said slot, and follower means on said pointer assembly connected to said dial assembly for positive movement therewith responsive to tilting movement of said upper section and free angular movement relative thereto during rotation of said control member.

7. In a tilt steering wheel assembly of the type having a fixed lower column section and an upper column section tiltable about a horizontal axis relative to said lower section, a transmission control shifter bowl concentrically surrounding said lower section and rotatable about the axis thereof through a predetermined angular range, said shifter bowl having an outwardly deformed wall portion defining an arcuate slot extending parallel with the axis of said shifter bowl, a transmission control position indicator dial assembly fixed on said upper section and tiltable therewith, said assembly including a dial member and an escutcheon member cooperating to form a trough extending through an angular range axially aligned with the angular range of movement of said arcuate slot, a pointer assembly slidable in said slot, and follower means on said pointer engaging said trough whereby the former is movable in said slot responsive to tilting movement of said dial assembly and slidable angularly in said trough responsive to rotation of said shifter bowl.

8. The structure set forth in claim 7 wherein said follower means includes a finger portion and an enlarged terminal end portion, the finger portion being readily flexible in a plane containing the axis of said shifter bowl.

References Cited by the Examiner

UNITED STATES PATENTS

| 2,518,175 | 8/50 | Pinardi | 74—493 |
|---|---|---|---|
| 2,672,116 | 3/54 | Gunderson | 116—124 |
| 2,672,117 | 3/54 | Morphew | 116—124 |
| 2,693,713 | 11/54 | Reid et al. | 74—484 |
| 2,696,126 | 12/54 | Lincoln et al. | 74—484 |
| 2,756,717 | 7/56 | Reid et al. | 116—124 |
| 2,786,108 | 3/57 | Sampson | 74—552 |
| 2,845,810 | 8/58 | Sampson | 74—493 |

LOUIS J. CAPOZI, *Primary Examiner.*